United States Patent [19]

Fernando et al.

[11] Patent Number: 5,761,492
[45] Date of Patent: Jun. 2, 1998

[54] METHOD AND APPARATUS FOR UNIFORM AND EFFICIENT HANDLING OF MULTIPLE PRECISE EVENTS IN A PROCESSOR BY INCLUDING EVENT COMMANDS IN THE INSTRUCTION SET

[75] Inventors: John Susantha Fernando, Coopersburg; Shaun Patrick Whalen, Wescosville, both of Pa.

[73] Assignee: Lucent Technologies Inc., Murray Hill, N.J.

[21] Appl. No.: 646,157

[22] Filed: May 7, 1996

[51] Int. Cl.$^6$ ..................................................... G06F 9/46
[52] U.S. Cl. ......................................... 395/591; 395/733
[58] Field of Search .......................... 395/591, 595, 395/733, 736, 737, 740, 742

[56] References Cited

U.S. PATENT DOCUMENTS

4,779,195  10/1988  James ........................... 395/733
5,193,158  3/1993  Kinney et al. .................. 395/591
5,537,559  7/1996  Kane .............................. 395/591
5,568,643  10/1996  Tanaka ............................ 395/739
5,579,498  11/1996  Ooi ................................ 395/595

*Primary Examiner*—Parshotam S. Lall
*Assistant Examiner*—Viet Vu

[57] ABSTRACT

An integrated circuit having a digital processor, a decode stage for decoding an instruction from the instruction set, an execute stage coupled to the decode stage for executing the instruction, and event logic coupled to the decode stage operable to provide an event commands to the decode stage to override the instruction. In one embodiment, an integrated circuit having a pipelined processor handles multiple precise events through the decode stage and execute stage through a process which includes the steps of detecting a plurality of events and issuing an event command, selecting a highest priority event from said the of events, providing an event vector and a link address for the highest priority event, and allowing the event vector and the link to be modified for a higher priority event until the event command is issued to the execute stage.

44 Claims, 8 Drawing Sheets

METHOD AND APPARATUS FOR UNIFORM AND EFFICIENT HANDLING OF MULTIPLE PRECISE EVENTS IN A PROCESSOR BY INCLUDING EVENT COMMANDS IN THE INSTRUCTION SET

FIELD OF THE INVENTION

The present invention relates generally to the field of digital microprocessors, and more particularly to a method for handling multiple precise events.

BACKGROUND OF THE INVENTION

Digital processors including microprocessors, microcontrollers, and digital signal processors are well-known control devices used in many consumer and non-consumer applications. In real-time applications, the processor must handle any combination of events correctly within a few cycles. The term event refers to an exception, an interrupt, a trap or fault condition that requires the processor to temporarily suspend the current instruction thread and execute a new one, called the event handler, wherein the suspended instruction stream must be resumed correctly (i.e. as if no event occurred). The time taken from the detection of the event to the first instruction of the event handler is referred to as interrupt latency. Short interrupt latency is desirable in real-time applications. Multiple events may occur simultaneously or within a very short time of each other.

Precise event means that an instruction can be identified such that all instructions preceding the event have been executed, and those after it have not. In other words, the state of the processor should be such that all instructions before the event have completed their alterations of processor state and all instructions executed after the event have not altered the processor state.

Precise events were easy to support when processor architectures were relatively simple and processed instructions one at a time. Modern processors, however, make use of many techniques to improve performance which complicates support for precise events. One particular architectural enhancement of this nature is the use of a pipeline. A processor pipeline is a technique for partitioning a processor's datapath such that each instruction is executed in stages. A pipeline incorporates parallelism in that each stage can operate in parallel with the other stages. Thus, the pipeline can process multiple instructions simultaneously, with each instruction in a different stage of execution. This technique improves performance by increasing the processor's throughput of instructions.

An exemplary pipelined processor may include a fetch, decode, execute, and writeback stage. The first stage is the FETCH stage where the processor fetches the next instruction to be executed. The second stage is the DECODE stage where the processor decodes the instruction just fetched, reads operands from a register file, and sets up the control to execute it. The third stage is the EXECUTE stage where the processor actually performs all or part of the operation specified in the instruction. In the fourth stage, the MEMORY stage, instructions which access memory actually read or write the memory. In the fifth stage, the WRITEBACK stage, the result of the instruction is written to the destination specified by the instruction (e.g. the register file). Since a pipeline has multiple instructions in execution at the same time, the concept of the completion of one instruction and the beginning of the next is not as straightforward as it was with simpler architectures. For example, some instructions such as jumps might complete in the DECODE stage, others such as stores might complete in the MEMORY stage.

Several issues arise in designing an event logic to support precise events for a pipelined processor. Some of these issues are a direct outgrowth of the use of a pipeline. Others are due to the interaction of the pipeline and other system features. These issues include restartable and non-restartable instructions, multiple events, pipeline flow control, and cost and complexity.

As would be understood, all instructions cannot be treated equally as far as event handling where a pipeline is concerned. Some architectures handle events in a pipelined processor by ensuring that no stage alters processor state except for the last stage. The response to an event in this architecture is to permit the instruction in the last pipeline stage to complete and prevent any of the other ones from advancing to their next pipeline stage. In the example pipeline, the instruction in the WRITEBACK stage may be allowed to alter the processor state (i.e. the register file) and instructions in the FETCH, DECODE, EXECUTE, and MEMORY stages would be abandoned.

This behavior is not appropriate in some systems since the concept of processor state must be extended to include components outside of the processor core. For example, consider the case of a processor performing a read from an external first-in-first-out (FIFO) memory in the MEMORY stage. In a system which shuts down the pipeline before the WRITEBACK stage, the FIFO read would complete, but that instruction would not complete. In this case, although the processor state is consistent in that the FIFO reading instruction has not altered internal state,.it has however altered external state. In particular, the processor cannot resume after this event by reexecuting the FIFO read instruction since it will then read a different FIFO location. Such an instruction is referred to here as non-restartable. A non-restartable instruction is one which does alter internal or external state before it reaches the end of the pipeline. Since it therefore cannot be reexecuted, it must be permitted to complete its pass through the pipeline (once it has finished any stage where it alters such state) even if an event occurs before it reaches the end of the pipeline. On the other hand, a restartable instruction is one which does not alter internal or external state until it passes through all stages of the pipeline. Thus, it can be reexecuted if it is interrupted before the end of the pipeline.

Another issue complicating event handling in a pipeline is when multiple events occur for instructions in different stages of the pipeline. This issue arises, in part, because of the non-restartable instruction requirement. Consider the case where an instruction being fetched encounters a fault in the FETCH stage while a non-restartable instruction is executing in a later stage. The event corresponding to the fetch fault cannot be taken immediately since the non-restartable instruction has not yet completed. Since the completion of the non-restartable instruction may take several clock cycles, some architectures record some state indicating that a fetch fault event has been detected. However, the process of completing the non-restartable instruction may itself generate an event. In this case, the event from the non-restartable instruction must supersede handling the fetch fault event to preserve the property of precise events. Since some event processing has already taken place for the fetch fault, some processor state may need to be changed or a history of pending events recorded to handle this case. Processors which handle multiple events in this way require significant complexity in their event logic. This complexity has a price in terms of performance, cost, and verification effort.

A third issue, closely related to the issue of restartable instructions is the issue of pipeline flow control. Some pipeline stages may always execute in one clock cycle while others may execute in a variable number of clock cycles. This requires a flow control mechanism between stages to stall or prevent earlier stages from advancing when a later stage requires more than one clock cycle. When event processing is overlaid on top of that for normal instructions, flow control can become complicated. Handling multiple events and non-restartable instructions requires the event logic to interact with the flow control mechanism. If a non-restartable instruction is a memory read or write operation, it may stall previous stages for which an event has been detected. The event processing for these earlier stages must obey the pipeline flow control to properly handle multiple events as discussed earlier.

Current approaches to the event logic problem are often for processors addressed to the desktop computer market. Event logic developed for desktop processors typically handle multiple events by associating event processing logic with each stage of the pipeline, e.g. tracking event status for each stage. Some handle multiple events by shutting down the pipeline and then refetching all of the instructions that were in an incomplete state in the pipeline when the event occurred. This technique requires multiple program counters to be saved and a mechanism for restarting multiple instruction threads. Other architectures ignore the problem of restartable instructions altogether. This extra complexity directly translates into a larger transistor budget required for the core, more silicon area, and thus more cost. Extra complexity also has an impact on time-to-market by increasing the resources which need to be devoted to verifying the correctness of the implementation.

SUMMARY OF THE INVENTION

The present invention is directed to a method and apparatus for handling multiple events in a precise manner. To attain this, the present invention provides an integrated circuit having a digital processor, a decode stage for decoding an instruction from the instruction set, an execute stage coupled to the decode stage for executing the instruction, and event logic coupled to the decode stage operable to provide a plurality of different event commands to the decode stage to override the instruction. By providing the ability to override the instruction, and thus exploit the flow control used for instruction processing, the digital processor is operable to handle multiple precise events in a low cost manner.

Consequently, the invention also provides a method for handling multiple precise events in a pipelined processor having a decode stage and execute stage which includes the steps of detecting a plurality of events and issuing an event command, selecting a highest priority event, providing an event vector and a link address for the highest priority event, and allowing the event vector and the link to be modified for a higher priority event until the event command is issued to the execute stage. Thus, the present invention overcomes, to a large extent, the limitations associated with the prior art.

The invention provides a method and apparatus for a processor to handle multiple events precisely in a uniform and efficient manner. This is done by including event commands which are interpreted like fetched (normal) instructions by the processor. They may be considered as an extension to the instruction set. The event commands are not available to the programmer and are issued only by the logic associated with processing events. The uniformity and efficiency allows the processor to provide fast interrupt processing and single stepping, key attributes in embedded applications, at very low cost. All events including reset (a basic event), interrupts, and single stepping (a complex event) are sequenced in a uniform manner by a simple finite state machine in the event logic that issues event commands to the decoder. This uniformity simplifies the design.

To achieve this the event logic feeds the decode stage with event commands which are decoded and executed like fetched instructions. Event commands override the fetched instructions. Since event commands are decoded and executed like fetched instructions, very little additional hardware is required in the decode, execute and other stages of the processor. For example, saving the program counter and the program status word are handled exactly like register to register moves. Jumping to the event handler is handled exactly like a call instruction. Thus an efficient implementation is achieved.

These and other features of the present invention are described in more complete detail in the following detailed description of embodiments of the invention when taken with the drawings. The scope of the invention, however, is limited only by the claims appended hereto.

BRIEF DESCRIPTION OF THE DRAWINGS

Various embodiments of the present invention are described and illustrated herein with reference to the drawings in which like items are indicated by the same reference designation, in which.

DETAILED DESCRIPTION

Although the present invention is described with reference to a specific embodiment of an embedded microprocessor, it would be understood that the scheme of handling multiple precise events of the present invention may be adapted for use with other digital processing devices having comparable hardware capabilities, including microcontrollers, and digital signal processors.

Figure 1:
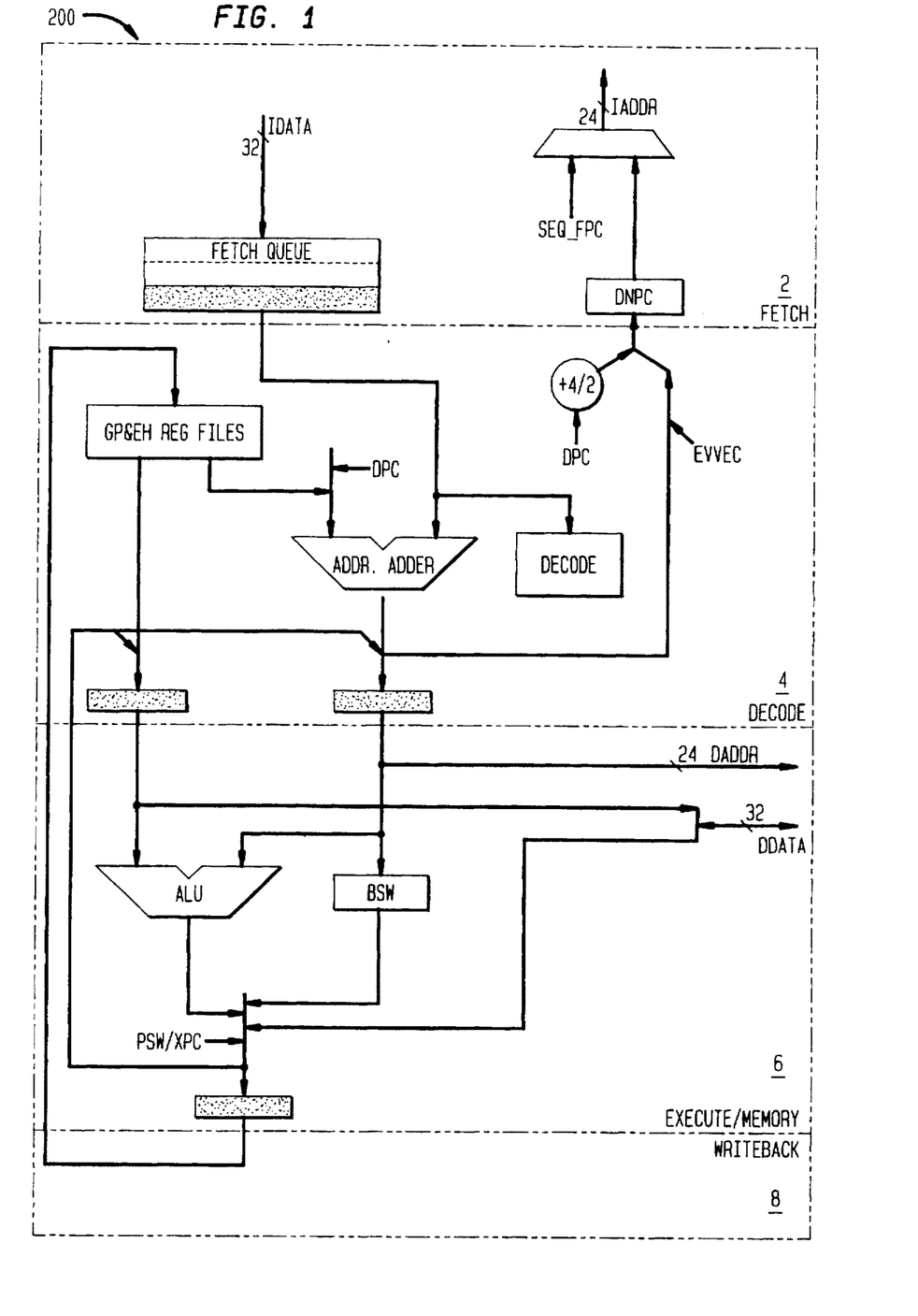
FIG. 1 shows one embodiment of processor pipeline as described in accordance with the present invention.

Referring to FIG. 1, there is shown one embodiment of a microprocessor 200 implementable in accordance with the present invention. As shown, the microprocessor 200 includes four pipeline stages: a fetch stage 2, decode stage 4, execute stage 6 and writeback 8 (not shown). As would be understood by those skilled in the art, instructions to be executed on the processor are fetched or retrieved by means of the fetch stage 2. The instructions are then decoded in the decode stage 4 and executed in an appropriate sequence in the execute stage 6.

Figure 2:
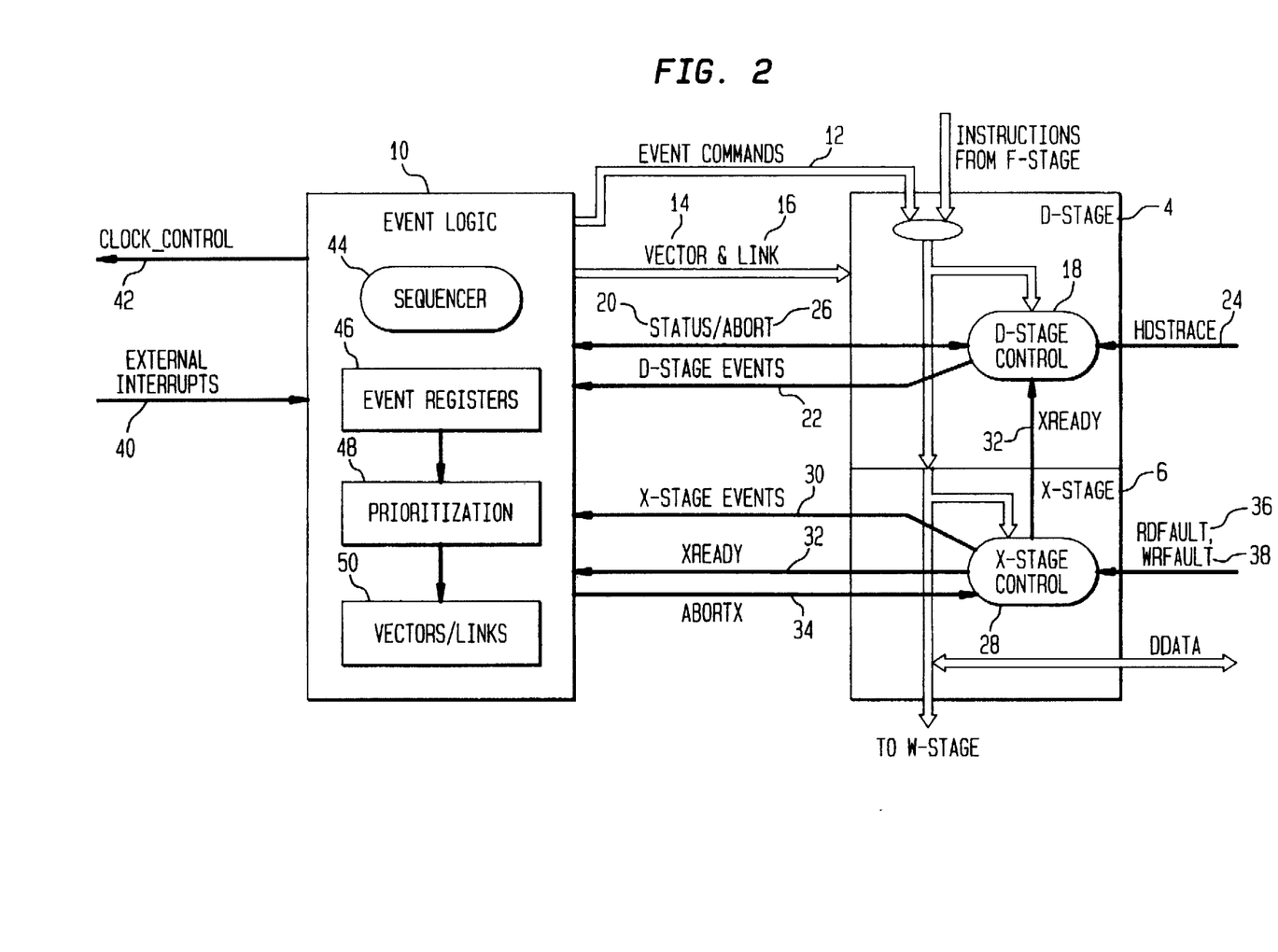
FIG. 2 is a diagram depicting how the event logic interacts with the processor's decode and execute stages.

Referring now to FIG. 2, there is shown one exemplary embodiment of event logic implementable in conjunction with the processor of the present invention. An event logic 10 interacts with the processor's decode stage 4 and execute stage 6. Event commands 12 from the event logic 10 are decoded by the decode stage 4 much like regular instructions from the fetch stage 2. The three event commands 12 are ESAVPC (i.e. event save program counter), ESAVPSW (i.e. event save program status word) and EVNOP. The event commands 12 are encoded in 2 bits. The commands are a minimal set that simply save the required processor state and vector to the proper event handler. The decode stage 4 decodes regular instructions (from the fetch stage 2) only if the event command 12 is EVNOP, since ESAVPC and ESAVPSW are assigned higher priority than regular instructions. The event logic 10 supplies an event vector 14, i.e. the new program counter (PC), and a link 16 to the decode stage 4. The link 16 is a 4-bit register number in event handling register file that stores the return PC and program status word (PSW). The event vector 14 is a 4-bit word address into the event vector table beginning at memory location zero. Inputs to the event logic 10 from the decode stage control 18 consists of status signals 20 and decode stage events 22. The decode stage 4 also receives the HDS-trace signal 24 from the HDS (Hardware Development System) logic that is external to the processor. The HDS logic is a block of debug-related logic outside of the core. The decode stage control 18 receives an abort signal 26 from the event logic 10.

The execute stage control 28 in the execute stage 6 in the processor core is a source of execute stage events 30. Execute stage events 30 are exceptions (events) related to instruction execution (divide by zero, memory read or write error) and events that are passed on in encoded form by the decode stage 4 to the execute stage 6. The execute stage control 28 outputs xready control signal 32 to the event logic 10 (the xready control signal 32 indicates that the execute stage 6 is ready for a new instruction from the decode stage 4). The signal abortx 34 terminates multiply and division instructions which take several clock cycles. If such an instruction is aborted, the execute stage 6 sets a flip-flop (SAVXPC) that ensures that the aborted instruction is restarted after completion of the event. The execute stage 6 receives read and write fault inputs known as rdfault 36 and wrfault 38 from the memory/IO system, and also provides these inputs to the event logic 10.

The event logic 10 receives external interrupt lines 40 which include Reset, Non Maskable Interrupt, Int0, and Int1. The event logic 10 also controls the processor clock via the clock control 42 for low-power operation. The low-power mode is entered on command from the D-stage 4 and is exited by an active external interrupt 40. As FIG. 2 illustrates, the event logic 10 does not interface with the fetch stage 2 nor with the writeback stage 8 directly.

The event logic 10 is controlled by a state machine called an event sequencer 44. The event logic 10 consists of Event Registers 46 to latch the events (interrupts, execute stage events and decode stage events), prioritization logic 48 to select the highest priority event from among many that may have been latched, and vector/link table 50 to supply the appropriate event vector 14 and link 16 for the selected event.

Events may originate from one of 3 sources: external interrupts 40, i.e. reset, maskable and nonmaskable interrupts, from the decode stage events 22 or from the execute stage events 30. Note that reset is also treated as an event (has highest priority). The decode stage 4 causes events due to instructions or text read faults. The text read fault for any instruction is passed on with the instruction as a status bit and causes a fault upon execution by the decode stage 4. The decode stage 4 raises events caused by instructions like Kcall (Kernel Call) or Trace (due to the Trace bit set in the processor status word). The decode stage 4 passes in encoded form to the execute stage 6 events related to privilege violation (executing privileged instructions in user mode), breakpoint and system breakpoint instructions and unimplemented instructions. The decode stage 4 raises the HDS-trace event which originates from the HDS logic outside the processor. The execute stage 6 raises events passed on by the decode stage 4, events related to read or write faults and the divide-by-zero exception.

The decode stage 4 assigns higher priority to event commands 12 than instructions from the fetch stage 2. The event commands 12 are decoded, just as instructions are, and operations are issued to the execute stage 6 in the usual manner. The current instruction stream is interrupted at the decode stage 4. Instructions already issued to the execute stage 6 are allowed to complete, unless they are multi-cycle arithmetic instructions which take many clock cycles to complete. Thus, the next instruction to be executed is precisely known, i.e. either the instruction that was preempted by the event command in the decode stage 4, or the multi-cycle arithmetic instruction which was aborted in the execute stage 6. Thus, there are two PC values, one of which is save to resume the interrupted instruction stream, the decode stage program counter (DPC) or the execute stage program counter (XPC). Which PC is saved is decided by the decode stage control 18 or the execute stage control 28.

Figure 3:
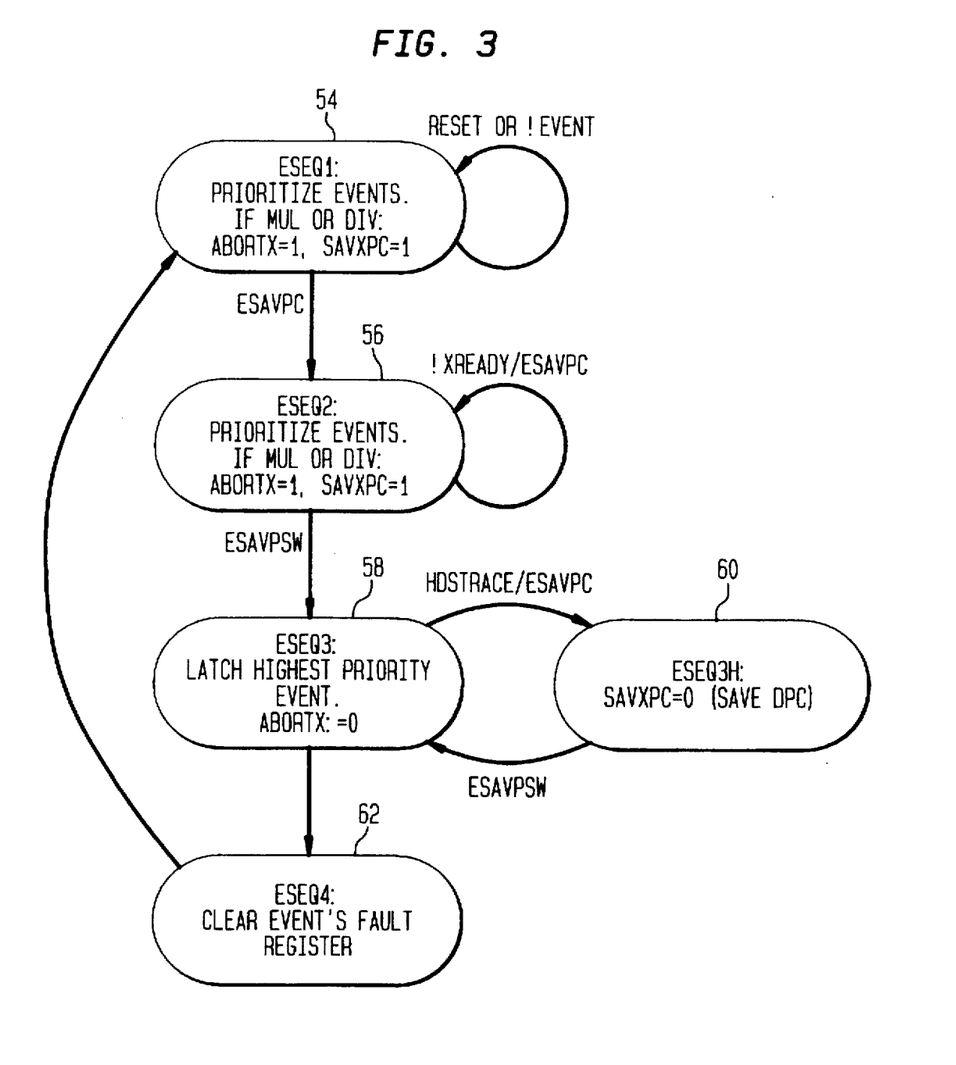
FIG. 3 shows an exemplary state diagram for the event sequencer (state machine) of the processor.

Referring to FIG. 3, the details of the event sequencer 44 are shown in the state diagram. The ESEQ1 state 54 is the reset or idle state, in which the event sequencer 44 remains until an event occurs. When one or more events occur, they are latched in dedicated event registers 46. Prioritization 48 of the latched events will select the highest priority event to be handled first. In parallel with prioritization 48, an ESAVPC command is issued to the D-stage 4. The X-stage 6 is issued an abortx 34 to abort current operations (abortx 34 is asserted only if a restartable multi-cycle instruction, like multiply or divide, is being executed). The event sequencer 44 transitions to the ESEQ2 state 56.

Any new events occurring in the ESEQ2 state 56 are latched and will be prioritized with the previous events. Thus, a new event could preempt the previous selection. The event selected for handling is latched in the appropriate select latch. When the execute stage 6 becomes ready, the event vector is issued to the fetch stage 2 for fetching the interrupt handler's first instruction. The ESAVPSW event command is issued and transition to the ESEQ3 state 58 occurs only if the execute stage 6 is ready (indicated by xready control signal 32). If the execute stage 6 is not ready (executing a non-restartable instruction) then prioritization 48 continues and will include newer events. If it is ready, the execute stage 6 transfers the PC to be saved (DPC or XPC) to the writeback stage 8.

In the ESEQ3 state 58, the event sequencer 44 is now committed to handle the selected event. Any new event occurring is simply latched for handling later. The execute stage 6 transfers the PSW to the writeback stage 8. If the HDS-trace signal 24 is not asserted, a transition to the ESEQ4 state 62 occurs, else transition to the ESEQ3H state 60 occurs and another ESAVPC command is issued.

The ESEQ3H state 60 enables the ESAVPC and ESAVPSW commands to be re-issued, facilitating single stepping into event handlers. The ESAVPC command issued by the ESEQ3 state 58 to ESEQ3H state 60 transition and the ESAVPSW command issued by the ESEQ3H state 60 to ESEQ3 state 58 transition cause the PC of the event handler being entered to be saved into the HDS block which is outside the processor core, and the PSW to be saved to a debug shadow PSW. The execute stage 6 access to the Mem/IO is used to save the PC and PSW, while the register file writes are disabled.

The ESEQ4 state 62 is the last state in the sequence and it clears the event register 46 and the selected event latch. Transition to the ESEQ1 state 54 occurs after a new instruction is fetched.

Event processing is the set of actions performed by the processor to detect and respond to an event. The response to an event is typically to save the context of the currently executing instruction thread and transfer control to an instruction thread which will handle or service the event. The saving of context and control transfer is performed by hardware logic circuits and not by software. The precise meaning of context differs from one processor architecture to the next. In older architectures, context included such things as the location of the stack and the content of the register file. In more modern architectures, the context is often limited to the address of the instruction which was executing when the processor detected the event and the value of the PSW indicating the execution status of the processor when the event was detected. The present invention saves these two items during its event processing through the use of event commands, one of the features of this invention.

By using a special event command set and associated control logic, the present invention performs the event control function with less complexity and more capability than existing approaches. Event commands are special instructions which are issued by the event logic 10 to the decode stage 4 to save the context of an event and transfer execution to an event handler. The event commands 12 are internal to the processor and are not visible to the programmer. Event commands 12 are higher priority than normal instructions. In other words, if both an active event command 12 and a normal instruction are present at the same time, the event command 12 operation will be performed and the normal instruction will be ignored.

The present invention microprocessor core's event architecture includes three event commands 12. These event commands 12 are EVNOP encoded with the two-bit value 00 (perform normal instruction decode, no active event command), ESAVPC encoded with the two-bit value 10 (do not perform normal instruction decode, save the program counter of the interrupted instruction thread), and ESAVPSW encoded with the two-bit value 11 (do not perform normal instruction decode, save the program status word of the interrupted instruction thread).

Figure 4:
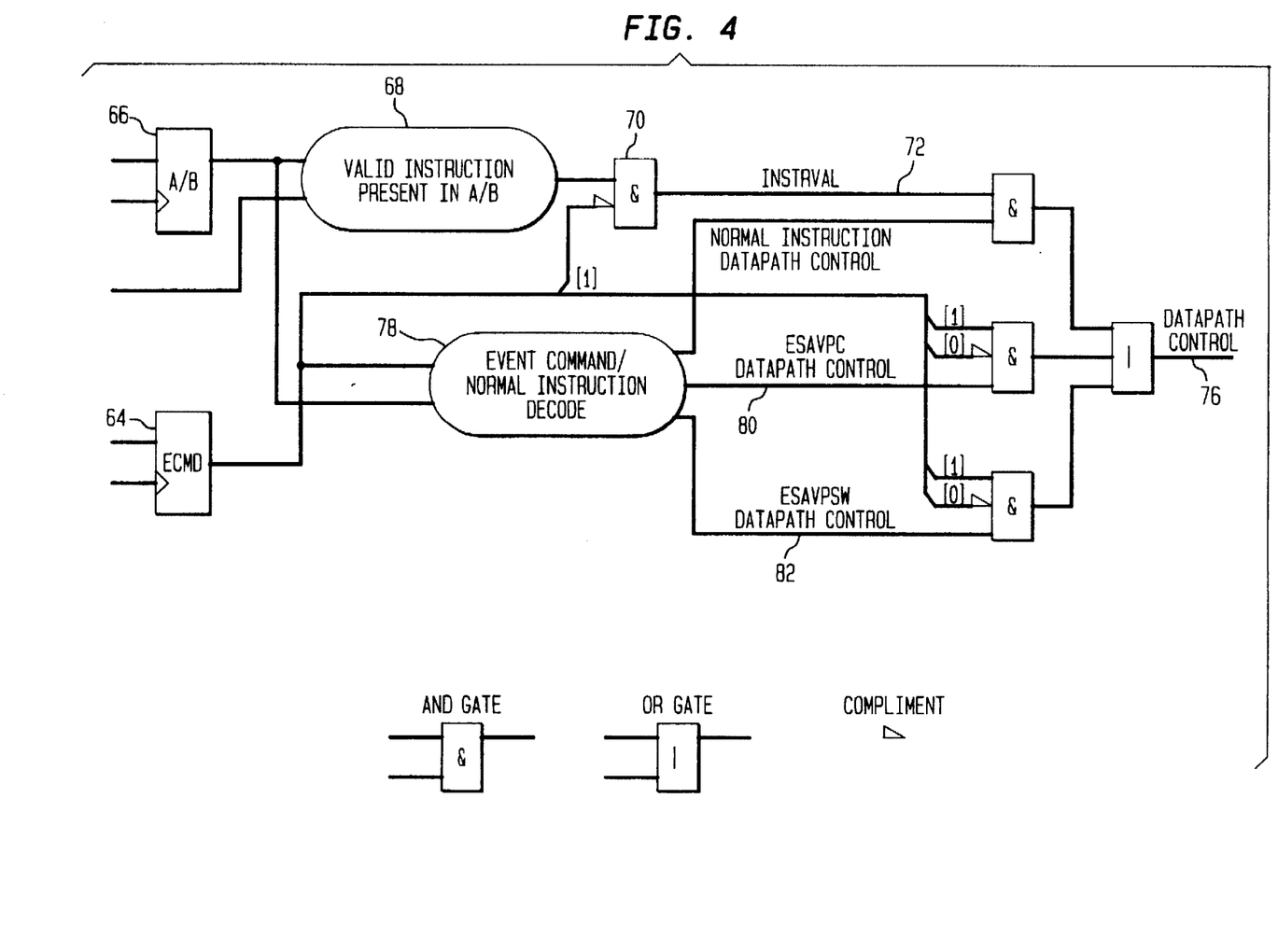
FIG. 4 is a block schematic diagram illustrating how the event commands override normal instruction decode control.

Referring now to FIG. 4, there is shown exemplary combinational logic to carry out an override of a normal instruction. The event commands 12 enter the pipeline at the same point as normal instructions, i.e. the decode stage 4. The decode stage 4 continuously examines both the current event command 12 in the ECMD register 64 and the current normal instruction in the A/B register 66. The event commands 12 are 2 bits wide and modify normal instruction decoding and thus don't require a separate decode path. During normal instruction decoding, the decode stage 4 examines the bits of the A/B register 66 and performs certain actions to prepare the operands of an instruction. In addition, the decode stage 4 creates the control bits which are issued to the execute stage 6 when the instruction advances to that stage. The decode stage 4 uses a datapath to perform the operations which prepare the operands of the instruction. The datapath is the set of functional units (e.g. register file, adder, multiplexers) which manipulate the operands of the instruction. This datapath is controlled by the decode stage control 18. Other pipeline stages have a similar partitioning between control and datapath. When the decode stage 4 decodes a normal instruction it asserts a signal called instrval 72, i.e. instruction valid, to indicate that a valid instruction is present in A/B register 68 to be decoded. When an active event command (ESAVPC or ESAVPSW) is present in the ECMD register 64, the decode control prevents instrval from being asserted. This prevents any control decoding of the instruction in the A/B register 66 from taking place. Instead, the control signals to the datapath are decoded from the contents of the ECMD register 64.

FIG. 4 illustrates exemplary combinational logic for accomplishing the above operation. The normal instruction resides in the A/B register 66. Bits from the instruction and from the fetch stage 2 are used to indicate whether a valid instruction is present in A/B register 68 for any given clock cycle. This indication is ANDED 70 with the complement of the most significant bit of the event command to form the instrval signal 72. Thus, instrval 72 is asserted only when the event command 12 is not ESAVPC or ESAVPSW. The instrval signal 72 enables the normal instruction decode control 74 to propagate to the datapath control 76. If an ESAVPC or ESAVPSW command is present in the ECMD register 64, instrval 72 is not asserted. Since ESAVPC and ESAVPSW are mutually exclusive values of the ECMD register 64, the corresponding datapath control 80 or 82 will be enabled to the datapath 76. Thus an event command 12 causes the decode stage 4 datapath to perform actions for the event command 12 and not for the normal instruction.

Figures 5, 5A:
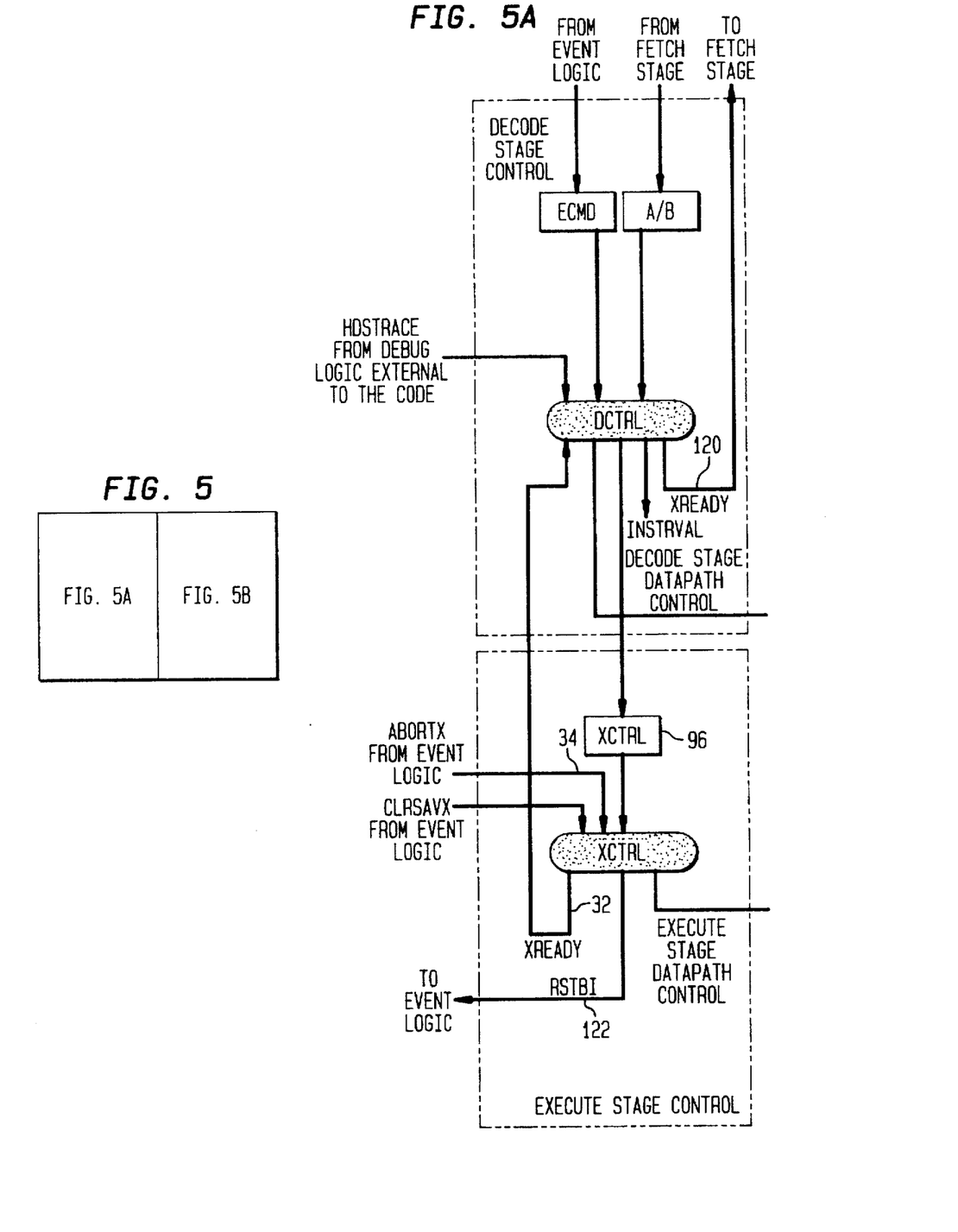
FIG. 5 is represented by FIGS. 5A and 5B in accordance with the figure key and is a block schematic diagram showing the digital processor core schematic diagram.
Figure 5B:
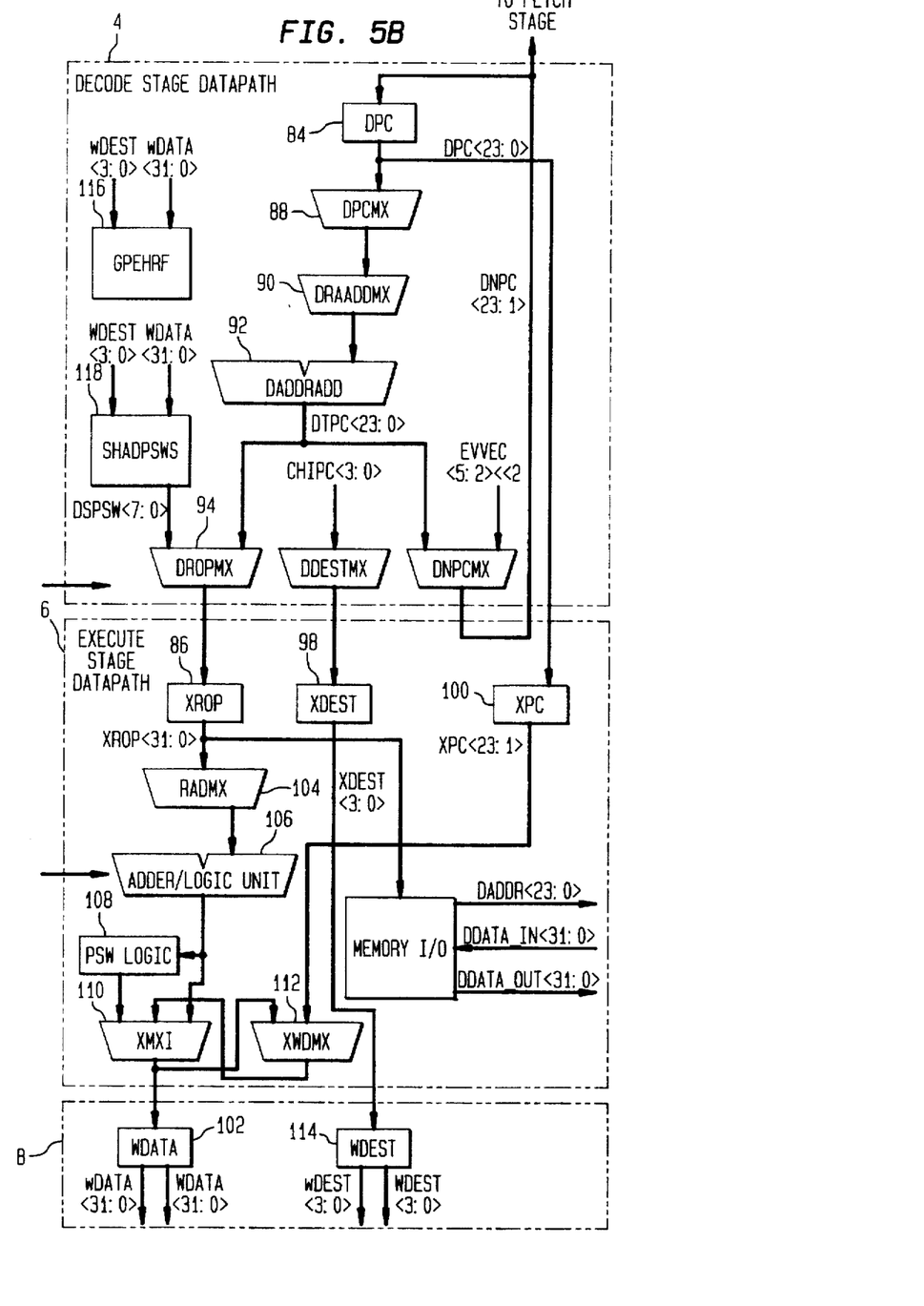

FIG. 5 shows a more detailed illustration of combinational logic operating on the core of the present invention microprocessor. This diagram shows parts of the decode stage 4, execute stage 6, and writeback stage 8. The fetch stage 2 is not shown as it does not have any event-specific logic. The logic shows only the parts of each pipeline stage which are involved in event processing.

The ESAVPC event command results in the decode stage 4 datapath selecting the value in DPC register 84 to be transferred to the XROP register 86 via the DPCMX multiplexer 88, the DRAADDMX multiplexer 90, the DADDRADD adder 92, and the DROPMX multiplexer 94. It also results in an instruction address, constructed from the EVVEC signal from the event logic 10, to be selected to the input of the DPC register 84 and to be output to the fetch stage 2 on the DNPC signal. The EVVEC signal is a 4-bit signal giving a unique code for the event which was detected. The instruction address created from the signal is the address of the event handler (the event vector) to which execution is directed by the ESAVPC command. The ESAVPC command results in the decode stage control 18 signaling the fetch stage 2 to perform a jump operation. This signaling is identical to that produced when the decode stage 4 decodes a normal jump instruction. The ESAVPC command results in the decode datapath transferring the address of the instruction which was in the decode stage 4 when the event command appeared (the value in DPC 84) to the execute stage datapath (XROP) 86 along with control bits for the execute stage control (XCTRL) 96. The control bits include signals to control the datapath of the execute stage 6 and a destination register number (XDEST) 98 to be passed to the writeback stage 8. The execute stage 6 selects either the contents of XROP 86 or the contents of XPC 100 to be transferred to the WDATA register 102. The contents of XROP 86 are transferred to the WDATA register 102 via the RADMX multiplexer 104, adder/logic unit 106, and XMX1 multiplexer 110. The contents of XPC 100 are transferred to the WDATA register 102 via XMX1 multiplexer 110 and the XWDMX multiplexer 112. The execute stage 6 transfers the contents of XDEST 98 to the WDEST register 114. The writeback stage 8 writes the contents of WDATA register 102 into the event handling bank of the GPEHRF register file 116 at the address given by WDEST register 114. This signaling and data is identical to that produced when the execute stage 6 performs a register to register move instruction.

The ESAVPSW event command results in the decode stage 4 creating control bits 96 for the execute stage 6 which perform two actions. The execute stage 6 is instructed to move the value of the PSW to the writeback stage 8 and the clear the contents of the PSW. The decode stage 4 provides a destination register address (XDEST 98) to the execute stage 6 indicating where the old PSW value should be stored by the writeback stage 8. This signaling is identical to that produced when the execute stage 6 performs a move from the PSW to a register in the GPEHRF register file 116, except for the clearing of the PSW which is unique to the ESAVPSW command. The writeback stage 8 writes the contents of the least significant 8 bits of the WDATA register 102 into a shadow psw register in the SHADPSW block 118 in the decode stage 4. The shadow psw register written is determined by WDEST register 114.

The encoding of the event commands 12 permits the decode stage 4 to switch decoding from normal instructions to event commands with essentially a single bit. The rest of the processor receives control which is indistinguishable from that of normal instruction execution and no special event execution control is needed. The only addition to the execute stage 6 control for processing event commands is the PSW logic 108 to clear the PSW and the logic to select either XROP 86 or XPC 100 as the return program counter value to transfer to WDATA register 102. The fetch stage 2 and writeback stage 8 have no logic dedicated to event processing. Thus event commands provide a less expensive implementation of the event processing function than other approaches.

Event commands obey the flow control signaling between pipestages in the same way as for normal instructions. This enables processing of multiple events in a precise manner without sacrificing the ability to handle non-restartable instructions.

Flow control for normal instructions is implemented by the xready control signals 32 and dready signal 120. The dready signal 120 controls the flow of instructions from the fetch stage 2 to the decode stage 4. When dready signal 120 is asserted, the fetch stage 2 may load a new instruction into the A/B register 66. When dready signal 120 is not asserted, the fetch stage 2 does not load a new instruction into the A/B register 66. The xready control signal 32 controls the flow of commands from the decode stage 4 to the execute stage 6. The xready control signal 32 is asserted only when the execute stage 6 is able to accept a new command. If the execute stage 6 is currently executing a command, it deasserts the xready control signal 32. When the xready control signal 32 is deasserted, the decode stage 4 will not issue a new command to the execute stage 6.

The event architecture uses the xready 32 and dready signals 120 to control the progression of the event commands through the pipeline and guarantee precise events. When an event command is loaded into ECMD register 64 in the decode stage 4, dready signal 120 is deasserted to prevent the fetch stage 2 from issuing a new instruction to A/B register 66 until the decode stage 4 has finished with the event command. This prevents any instructions after the event-causing instruction from altering any state internal or external to the core. An event command obeys the execute stage flow control to delay issuing the execute command associated with the event until the execute stage 6 is ready. A precise event is one for which the saved PC value points to either the event causing instruction or a restartable instruction, or an instruction which has not yet been issued by the decode stage 4. This is consistent with the previous definition of precise. When an event command is present in the decode stage 4, the correct program counter value to make the event precise is either the value in DPC 84 or the value in XPC 100. To make the event precise requires choosing the register which holds either the address of the instruction causing the event or the address of a restartable instruction for an event which was not caused by an instruction (e.g. an external asynchronous interrupt). If the event was raised by an instruction in the decode stage 4, the address of that instruction will be in DPC 84. If the event was raised by an instruction in the execute stage 6, the address of that instruction will be in XPC 100. If the event was not caused by an instruction in the pipeline, the address to be saved may be in either DPC 84 or XPC 100.

The correct address is selected by a combination of logic in the decode stage 4 and the event logic 10. The decode stage 4 selects whether DPC 84 or XPC 100 is saved based on the command which it issues to the execute stage 6 for the ESAVPC event command. The ESAVPC event command does not alter the XPC register 100. If the decode stage 4 receives the ESAVPC event command on the same rising clock edge where it has just issued a command to the execute stage 6, its command to the execute stage 6 is to save the XPC register 100 as the event return address. The instruction just issued to the execute stage 6 (and therefore addressed by XPC 100) cannot have changed any state since the event logic 10 aborts the execute stage 6 processing (via abortx signal 34) at the same time that the ESAVPC command is issued to the execute stage 6. If the decode stage 4 receives an ESAVPC event command and has not just issued a command to the execute stage 6, it tells the execute stage 6 to transfer DPC 84 (via XROP 86) as the saved address. If the execute stage 6 was executing a restartable command when the ESAVPC command was issued to the decode stage 4, it ignores the DPC 84/XPC 100 selection from the decode stage 4 and chooses XPC 100. In this case, the event is precise since the address of a restartable instruction (one which has not altered machine state).is saved as the event return address. However, if the execute stage 6 was idle or was executing a nonrestartable command, it obeys the decode stage 4's ESAVPC command and saves DPC 84 to the register file as the event return address. In this case, the event is precise since the non-restartable instruction prior to the event has completed and the instruction pointed to by the event return address (the one in the decode stage 4) has not altered any state. A final case is possible where the execute stage 6 is executing a non-restartable instruction and detects an event caused by that instruction. In this case, the execute stage 6 will receive the abortx signal 34 directing it to select XPC 100 as the event return address. This makes the event precise since the address of the event-causing instruction is saved. In all of these cases, the ESAVPC execute command is not issued to the execute stage 6 until xready control signal 32 is asserted. Thus, precise events for non-restartable instructions are supported.

The event control logic, which issues the event commands, includes control to handle multiple events independently of the decoding of the event commands and without requiring any history buffers. For example, if while processing the event command for a low priority asynchronous interrupt, a high priority data read fault occurs, the data read fault is handled transparently by the event logic 10. This feature is enabled by the invention's decoupling of the event command decode and the information indicating the return address to save and its register address in the event handling bank of the register file.

Figure 6:
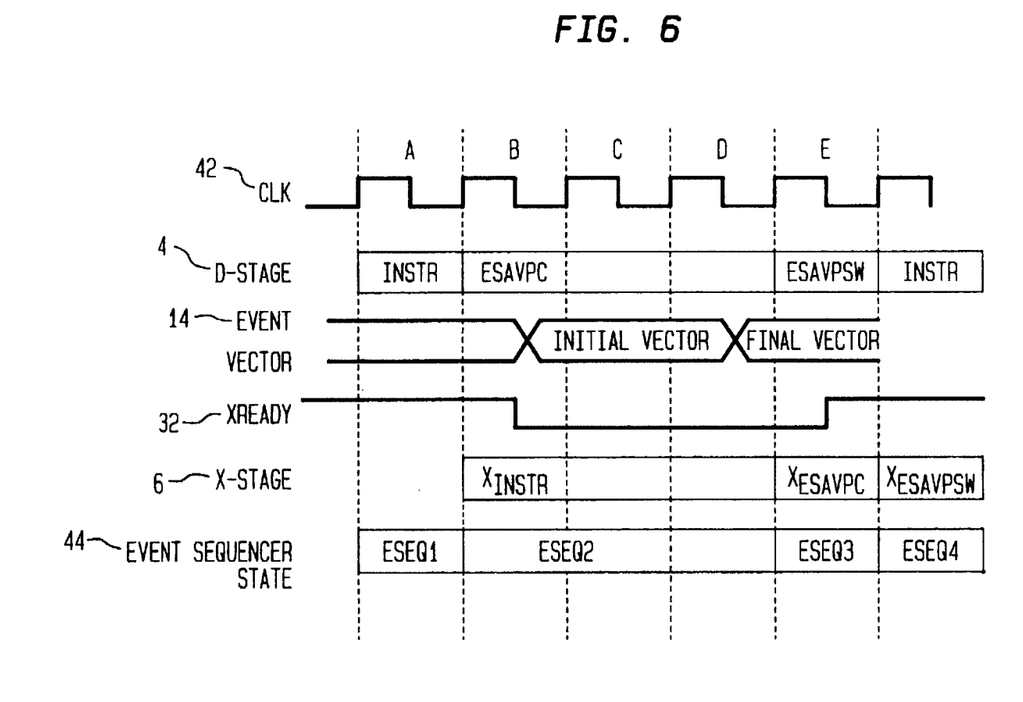
FIG. 6 shows a timing diagram for event commands and vector timing.

FIG. 6 shows how the timing of event commands and how the application of the event vector 14 implements this feature. In this example, the decode stage is processing a stream of instructions (one of which is indicated by INSTR) when an ESAVPC event command appears. This event command 12 overrides decoding the instruction present in that cycle and instead starts the event sequence. Since an ESAVPC event command issues an operation to the execute stage 6, it must obey the execute stage flow control signal, xready 32, and delay issuing the command to the execute stage 6 until xready 32 is asserted. During this time, the event logic 10 is providing the event vector 14. As FIG. 6 illustrates, even though the decode stage 4 has begun processing the event command 12, the event vector 14 can still be changed up until the time that the execute stage 6 accepts the execute command 12 associated with the ESAVPC. In the scenario illustrated by the figure, the execute stage 6 may have been processing a load instruction when the decode stage 4 received an event command for an asynchronous interrupt. If the execute stage 6 observed a data read fault while completing the load, it would inform the event logic 10 which could change the event vector 14 from asynchronous interrupt (initial vector) to data read fault (final vector) without affecting the decode stage 4's decoding of the event command.

This feature is implemented by the first two states of the event sequencer 44 (see FIG. 3). During cycle A, the event sequencer 44 is in ESEQ1 state 54. In this state, the event sequencer 44 prioritizes the latched event in the event register and selects the highest priority to handle and issues the ESAVPC command. In cycles B through D, the event sequencer 44 is in the ESEQ2 state 56. The decode stage 4 has received the ESAVPC command is waiting for xready 32 to be deasserted so it can issue this command to the execute stage 6. While in the ESEQ2 state 56, the event sequencer 44 provides a register address (which indicates where the link PC and PSW are saved) to be loaded into XDEST 98 and an event vector 14 to be fetched when the event command 12 is issued. The event sequencer 44 performs prioritization 48 again while in the ESEQ2 state 56. If it finds a higher priority event asserted, it changes the register address and event vector 14 to reflect the new highest priority event. The ESAVPC command is independent of the event being processed. Thus, while the decode stage 4 is waiting for a non-restartable instruction to be completed in the execute stage, the event logic 10 can handle subsequent events without having to undo any event processing.

A requirement for event handling in embedded systems is that reads and writes to peripherals cannot be reexecuted once they have accessed the peripheral. These instructions are not restartable, although other instructions must be restartable. Other event architectures for pipelined processors ignore this requirement and restart all instructions which have not modified the processor machine state. Typically machine state only refers to state within the processor core, not peripheral state. The present invention's decoupling of the event command decode from the return address specification differentiates restartable and non-restartable instructions with less control and without affecting interrupt latency by applying the control in the execution pipeline stage. The handling of non-restartable instructions is implemented by the execute stage 6 (see FIG. 5). If the execute stage 6 is processing an instruction which is restartable, it informs the event logic 10 by asserting the rstbl signal 122. When the rstbl signal 122 is asserted and the execute stage 6 is performing some operation, the event logic 10 asserts the abortx signal 34 to interrupt the execute stage 6's processing and cause it to select the XPC 100 instead of XROP 86 when performing the command associated with the ESAVPC event command. If the execute stage 6 is processing a non-restartable instruction, it does not assert rstbl signal 122. This informs the event logic 10 that it cannot assert abortx signal 34 and thus, the non-restartable instruction will execute to completion. Furthermore, the execute stage 6 will select XROP 86 (containing decode stage PC) instead of XPC 100 when performing the command associated with the ESAVPC event command. Thus, the correct return address will be saved into the event handling bank of the register file.

The event control/command approach treats all events uniformly, including reset and trace events. Trace events are also known as single step events. A particularly difficult aspect of event handling is single stepping through an event. Many processors do not offer this capability. The present invention offers this capability with minimal complexity. One additional state, i.e. the ESEQ3H state 60, in the event state machine implements the single stepping event. No additional event command decode is required since the same event commands are used for the single step as for other events. Single stepping through events is possible by dynamically changing the priority of the single step event from lowest to highest when other simultaneous events occur.

Figure 7A:
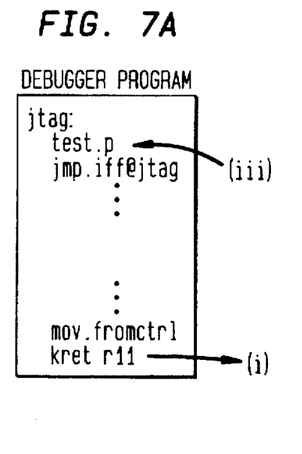
FIG. 7 is represented by FIGS. 7A, 7B and 7C in accordance with the figure key and shows single stepping into an event handler.
Figure 7B:
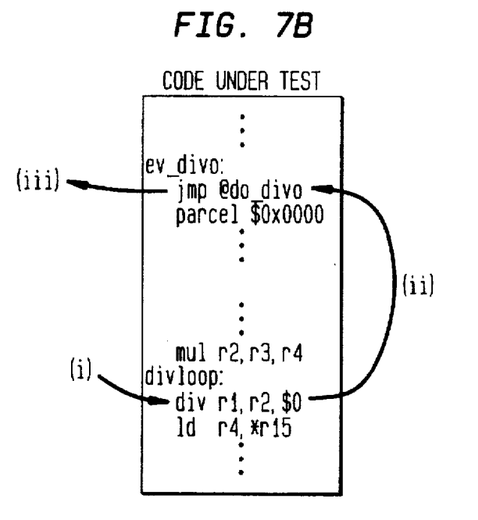
Figure 7C:
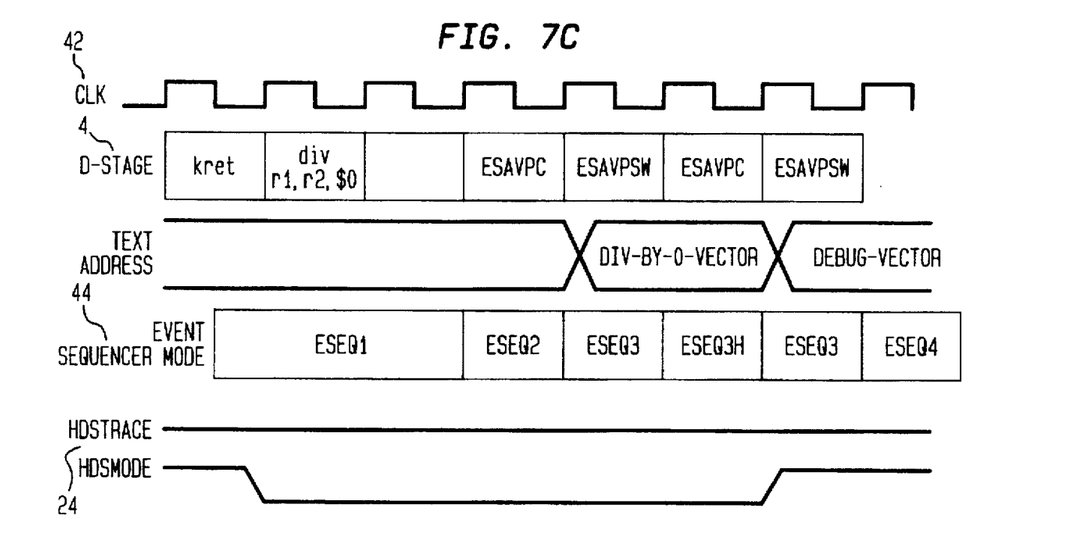

FIG. 7 shows the action of single stepping into an event handler. As shown in FIG. 7, there are two listings of assembly language instructions labeled (a) and (b) and a timing diagram labeled (c) illustrating the timing of the instructions and event commands. Listing (a) represents a debugger program which controls execution of an application program under development. This application program, represented by listing (b) is referred to as code under test. The code under test consists of some event handlers (one example of which, the divide by zero handler, is shown) and application code (suggested by the mul/div/ld sequence). One of the functions of the debugger program is to enable execution of exactly one assembly instruction of the code under test. This function is referred to as single stepping the code under test. When execution returns to the debugger program after a single step, the state of the code under test is such that the next single step will execute the next assembly language instruction. If the assembly language instruction being single stepped encounters an event, the logical behavior is to return to the debugger program with the machine state such that the next instruction to be single stepped is the first instruction of that event's handler. FIG. 7 illustrates the scenario for a divide by zero event. In this example, the debugger program is executing at the end of its code. Execution returns to the code under test to step another instruction as indicated by transition arc (i). The instruction being stepped is a divide with a divisor of 0 in the code under test. While this divide is being executed, the event priority puts the HDS-trace (or single step) event at lowest priority. Thus, the divide by zero event is detected and two event commands are issued to take this event. This results in execution transferring to the divide by zero event handler as indicated by transition arc (ii). The return address for the divide by 0 event handler is divloop, saved in a register in the event handling bank of the register file. When these two event commands are executed, the priority is effectively changed so that only the HDS-trace event is permitted. In this example, this signal is asserted, so a second pair of event commands is issued to transfer execution back to the debugger program, as indicated by the transition arc (iii). The return address for this event is ev__div0 which is saved to a register in the HDS block external to the core. Thus, the single step on the divide instruction returns to the debugger with the machine state such that the first instruction of the divide by zero handler is the next instruction to be single stepped. This permits the user to continue stepping and debug the divide-by-zero event handler.

The event sequencer 44 implements this feature. As show in FIG. 7, the event sequencer 44 is initially in ESEQ1 state 54, its idle state. When it detects the divide by zero event, it enters the ESEQ2 state 56 while issuing the ESAVPC event command. In this example, the event sequencer 44 would assert abortx 34 to abort the divide by zero operation in the execute stage 6. Thus, it would transition from the ESEQ2 state 56 to ESEQ3 state 58 while issuing the ESAVPSW command. This ESAVPC/ESAVPSW pair saves the address of the divide by zero to a register in the event handling bank of the register file and saves the current psw value to one of the shadow psws. While in ESEQ3 state 58, the event sequencer 44 detects the HDS-trace event asserted and that HDS-mode is not asserted. This combination causes the sequencer to transition to the ESEQ3H state 60 while issuing an ESAVPC command. The sequencer then sets the HDS-mode signal and always transitions back to ESEQ3 state 58 while issuing an ESAVPSW command. Once back in the ESEQ3 state 58, the asserted state of the HDS-mode signal prevents the sequencer from transitioning to ESEQ3H state 60 again and instead causes the transition to ESEQ4 state 62. This second ESAVPC/ESAVPSW pair transfers the address of the divide by zero event handler (the divide by zero event vector) over the ddata output bus 52 (which is depicted in FIG. 2) to the external debug logic block and transfers the divide by zero event handler psw value to the HDS shadow PSW. The HDS shadow psw saves the current psw for debug events in the same way that other shadow psws save the current psw for other classes of events.

The typical period the pipeline stalls during an event is 4 clock cycles (assuming 1-clock memory). Two of these cycles are for saving the PC and PSW. The other two are for fetching the first instruction of the event handler, identical to the 2-cycle stall required for a jump instruction.

The advantages of the present invention is that the event control/commands provide handling of multiple events, non-restartable and restartable instructions, single stepping through events and precise events with low impact on normal instruction while preserving latency.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined by the appended claims.

What is claimed:

1. An integrated circuit including a digital processor implementing an instruction set having fetched instructions for program execution and event commands in response to an event, said integrated circuit comprising:
   a decode stage for decoding an instruction from the instruction set;
   an execute stage coupled to said decode stage for executing said instruction; and
   event logic coupled to said decode stage for issuing an event command to said decode stage, said event logic handling said event in a precise and uniform manner, wherein said event includes stage events and external interrupts, said stage events and external interrupts being sequenced in said uniform manner by said event logic by issuance of said event command to said decode stage.
   said decode stage and said execute stage processing said instruction using the same data path and control logic, said instruction being one of said event commands and said fetched instructions.

2. An integrated circuit as in claim 1 wherein said event command includes an event save program counter command, an event save program status word command, and an event no-operation command, said event save program counter command and said event save program status word command are assigned a higher priority than a fetched instruction from said instruction set.

3. An integrated circuit as in claim 1 wherein said event command is encoded in 2 bits.

4. An integrated circuit as in claim 1 wherein said event command instructs said decode stage to save a program counter, and wherein said event command is processed through a plurality of control and datapath signals that execute instructions from said instruction set to transfer control to an event handler indicated by an event vector.

5. An integrated circuit as in claim 1 wherein said event command instructs said decode stage to save a program status word, and wherein said event command is processed through control and datapath signals that execute normal instructions to save said program status word in a shadow PSW register indicated by a link.

6. An integrated circuit as shown in claim 1 wherein said event command is a no-operation command allowing execution of a fetched instruction.

7. An integrated circuit as in claim 1 wherein said event logic further supplies an event vector for providing an address of an event handler to said decode stage.

8. An integrated circuit as in claim 7 wherein said event vector is a four-bit address of an event vector table.

9. An integrated circuit as in claim 1 wherein said event logic further supplies a link for providing a register address which stores a program counter of an interrupted instruction to said decode stage.

10. An integrated circuit as in claim 9 wherein said link is a four-bit register number in an event handling register file that stores the program counter and indicates in which shadow PSW to store a program status word.

11. An integrated circuit as in claim 1 wherein said decode stage inputs status signals and events to said event logic.

12. An integrated circuit as in claim 1 wherein said event logic receives events from said execute stage.

13. An integrated circuit as in claim 1 further comprising a plurality of pipeline flow control signals that indicate busy/ready status of said decode stage and said execute stage for processing multiple events precisely.

14. An integrated circuit as in claim 1 wherein said event logic further includes event registers to latch events, prioritization logic to select a high priority event from a plurality of events that occur simultaneously, and a vector/link table to supply an appropriate event vector and a link for said selected event.

15. An integrated circuit as in claim 1 wherein said event logic includes a sequencer, said sequencer being a finite state machine.

16. An integrated circuit as in claim 1 wherein said event command is selected from the group comprising an event save program counter command, an event save program status word command, and a no-operation command.

17. An integrated circuit as in claim 1 wherein said event is selected from the group comprising exceptions, interrupts, traps, and faults.

18. A digital processor implementing an instruction set having fetched instructions for program execution and event commands in response to an event, the digital processor comprising:
- a decode stage for decoding an instruction from the instruction set;
- an execute state coupled to said decode stage for executing said instruction; and
- event logic coupled to said decode stage for issuing an event command to said decode stage, said event logic handling said event in a precise and uniform manner, wherein said event includes stage events and external interrupts, said stage events and external interrupts being sequenced in said uniform manner by said event logic by issuance of said event command to said decode stage.
- said decode stage and said execute stage processing said instruction using a same data path and control logic, said instruction being one of said event commands and said fetched instructions.

19. A digital processor as in claim 18 wherein said event command includes an event save program counter command, an event save program status word command, and an event no-operation command, said event save program counter command and said event save program status word command are assigned a higher priority than a fetched instruction from said instruction set.

20. An digital processor as in claim 18 wherein said event command is encoded in 2 bits.

21. A digital processor as in claim 18 wherein said event command instructs said decode stage to save a program counter, and wherein said event command is processed through a plurality of control and datapath signals that execute normal instructions to transfer control to an event handler indicated by an event vector.

22. A digital processor as in claim 18 wherein said event command instructs said decode stage to save a program status word, and wherein said event command is processed through control and datapath signals that execute normal instructions to save said program status word in a shadow PSW register indicated by a link.

23. A digital processor as in claim 18 wherein said event command is a no-operation command allowing execution of a fetched instruction.

24. A digital processor as in claim 18 wherein said event logic further supplies an event vector for providing an address of an event handler to said decode stage.

25. A digital processor as in claim 24 wherein said event vector is a four-bit address of an event vector table.

26. A digital processor as in claim 25 wherein said event logic further supplies a link for providing a register address which stores a program counter of an interrupted instruction to said decode stage.

27. A digital processor as in claim 18 wherein said link is a four-bit register number in an event handling register file that stores the program counter and indicates in which shadow PSW to store a program status word.

28. A digital processor as in claim 18 wherein said decode stage inputs status signals and events to said event logic.

29. A digital processor as in claim 18 wherein said event logic receives events from said execute stage.

30. A digital processor as in claim 18 further comprising a plurality of normal pipeline flow control signals that indicate busy/ready status of said decode stage and said execute stage for processing multiple events precisely.

31. A digital processor as in claim 18 wherein said event logic further includes event registers to latch events, prioritization logic to select a high priority event from a plurality of events that occur simultaneously and a vector/link table to supply an appropriate event vector and a link for said selected event.

32. A digital processor as in claim 18 wherein said event logic includes a sequencer, said sequencer being a finite state machine.

33. A digital processor as in claim 18 wherein said event command is selected from the group comprising an event save program counter command, an event save status word command, and a no-operation command.

34. A digital processor as in claim 18 wherein said event is selected from the group comprising exceptions, interrupts, traps, and faults.

35. An integrated circuit as in claim 1 wherein said event logic further provides a method of single stepping into an event handler to enable debugging.

36. The integrated circuit of claim 35 wherein said method of single stepping comprising the steps of:
- (a) returning operation of the digital processor from the debug event handler in a hardware single step mode;
- (b) clearing an HDS-mode signal to change the state of the processor to leave a debug mode;
- (c) starting execution of a single instruction;
- (d) detecting an event;
- (e) issuing an event command to save the program counter to the decode stage;
- (f) issuing an event command to save the program status word to the decode stage;
- (g) issuing an event command to save the program counter if the hardware single step enable signal is asserted and the HDS-mode signal is asserted;
- (h) issuing an event command to save the program status word if the hardware single step enable signal is asserted and the HDS-mode signal is asserted;
- (i) setting the HDS-mode signal if the hardware single step enable signal is asserted and the HDS-mode is not asserted; and
- (j) returning to the debug event handler.

37. A digital processor as in claim 18 wherein said event logic further provides a method of single stepping into an event handler to enable debugging.

38. The digital processor of claim 37 wherein said method of single stepping comprising the steps of:
- (a) returning the digital processor from the debug event handler in a hardware single step mode;
- (b) clearing an HDS-mode signal to change the state of the processor to leave a debug mode;
- (c) starting execution of a single instruction;
- (d) detecting an event;
- (e) issuing an event command to save the program counter to the decode stage;

(f) issuing an event command to save the program status word to the decode stage;

(g) issuing an event command to save the program counter if the hardware single step enable signal is asserted and the HDS-mode signal is asserted;

(h) issuing an event command to save the program status word if the hardware single step enable signal is asserted and the HDS-mode signal is asserted;

(i) setting the HDS-mode signal if the hardware single step enable signal is asserted and the HDS-mode is not asserted; and (j) returning to the debug event handler.

39. A method for handling multiple precise events in a pipelined processor having a decode stage, event logic and an execute stage, the method comprising the steps of:

(a) detecting a plurality of events and issuing an event command from the event logic to the decode stage to interrupt instruction flow, said plurality of events including stage events and external interrupts;

(b) selecting a highest priority event from said plurality of events;

(c) providing an event vector and a link address for said highest priority event; and (d) allowing said event vector and said link to be modified for a higher priority event until the execute stage is ready for said event command.

40. A method as in claim 39 further comprising the step of storing all events in event registers before the selecting step.

41. A method as in claim 39 further wherein the allowing step involves latching the event inputs.

42. A method as in claim 39 wherein the detecting step involves latching all events from a group consisting of external interrupts, decode stage events, and execute stage events.

43. A method as in claim 39 further including the step of clearing the selected event associated with an earlier pipeline stage.

44. An integrated circuit as in claim 1 wherein said instruction set includes restartable and non-restartable instructions.

* * * * *